(12) United States Patent
Van Deurzen (10) Patent No.: US 11,674,554 B2
(45) Date of Patent: Jun. 13, 2023

(54) LAY-SHAFT ASSEMBLY FOR USE IN A VEHICLE TRANSMISSION

(71) Applicant: Punch Powertrain N.V., Sint-Truiden (BE)

(72) Inventor: Antonius Arnoldus Maria Van Deurzen, Sint-Truiden (BE)

(73) Assignee: PUNCH POWERTRAIN PSA E-TRANSMISSIONS NV, Sint-Truiden (BE)

( * ) Notice: Subject to any disclaimer, the term of this patent is extended or adjusted under 35 U.S.C. 154(b) by 178 days.

(21) Appl. No.: 17/257,346

(22) PCT Filed: Jul. 3, 2019

(86) PCT No.: PCT/EP2019/067908
§ 371 (c)(1),
(2) Date: Dec. 31, 2020

(87) PCT Pub. No.: WO2020/007943
PCT Pub. Date: Jan. 9, 2020

(65) Prior Publication Data
US 2021/0270329 A1    Sep. 2, 2021

(30) Foreign Application Priority Data
Jul. 3, 2018   (BE) .................................. 2018/5467

(51) Int. Cl.
*F16H 3/087*   (2006.01)
*F16H 63/32*   (2006.01)
(Continued)

(52) U.S. Cl.
CPC ............ *F16D 21/04* (2013.01); *F16D 23/06* (2013.01); *F16H 3/087* (2013.01); *F16H 63/32* (2013.01);
(Continued)

(58) Field of Classification Search
CPC .......... F16H 3/087; F16H 63/32; F16D 21/04; F16D 23/06
(Continued)

(56) References Cited

U.S. PATENT DOCUMENTS 2,433,428 A  * 12/1947  Carnagua ................ F16D 23/10
                                                            192/114 R
2,483,180 A    9/1949  Catford
(Continued)

FOREIGN PATENT DOCUMENTS

AT     384090 B     2/1987
DE   10037401 A1    2/2002

OTHER PUBLICATIONS

International Search Report dated Jul. 30, 2019 issued in corresponding International Patent Application No. PCT/EP2019/067908 (4 pgs.).

*Primary Examiner* — Ha Dinh Ho
(74) *Attorney, Agent, or Firm* — Pillsbury Winthrop Shaw Pittman, LLP (57) ABSTRACT

A lay-shaft assembly for use in a vehicle transmission, including a lay-shaft which is rotatable around a central axis, a first gearwheel rotatable around the lay-shaft and the central axis, a second gearwheel fixedly connected to the lay-shaft and rotatable with the lay-shaft around the central axis, and a clutching assembly rotatable around the lay-shaft and the central axis. The clutching assembly includes a driven gearwheel and clutching mechanism for selectively coupling the rotation of the driven gearwheel to either the first gearwheel or the second gearwheel. The clutching assembly has a first axial end and a second axial end opposite the first axial end. The first gearwheel and the second gearwheel are arranged on a part of the lay-shaft extending from the first axial end of the clutching assembly.

16 Claims, 6 Drawing Sheets

(51) Int. Cl.
*F16D 21/04* (2006.01)
*F16D 23/06* (2006.01)
(52) U.S. Cl.
CPC .. *F16D 2023/0625* (2013.01); *F16H 2306/48* (2013.01)
(58) Field of Classification Search
USPC .......................................................... 74/339
See application file for complete search history.

(56) References Cited

U.S. PATENT DOCUMENTS

| | | | |
|---|---|---|---|
| 9,518,614 B2* | 12/2016 | Baur ..................... | F16D 27/004 |
| 9,611,917 B2* | 4/2017 | Takahashi ............... | F16H 3/089 |
| 9,638,315 B2* | 5/2017 | Kelly ...................... | F16H 3/089 |
| 2003/0116397 A1* | 6/2003 | Ima ........................ | F16D 23/06 |
| | | | 192/48.91 |
| 2003/0181279 A1* | 9/2003 | Yamada ................ | F16H 3/0915 |
| | | | 475/198 |
| 2010/0126291 A1 | 5/2010 | Palazzetti et al. | |
| 2013/0334000 A1* | 12/2013 | Gerauer ................ | F16D 27/108 |
| | | | 192/69.7 |
| 2016/0131223 A1 | 5/2016 | Hemphill et al. | |

* cited by examiner

LAY-SHAFT ASSEMBLY FOR USE IN A VEHICLE TRANSMISSION

CROSS-REFERENCE TO RELATED APPLICATIONS

This application is the U.S. National Phase of International Application No. PCT/EP2019/067908, filed Jul. 3, 2019, which claims priority to Belgium Application No. BE 2018/5467, filed Jul. 3, 2018, the entire contents of each of which are herein incorporated by reference in its entirety.

FIELD

The invention relates to a lay-shaft assembly for use in a vehicle transmission.

BACKGROUND

Most vehicle transmissions in modern vehicles comprise a synchronized gear box. Such a synchronized gearbox typically comprises an input shaft coupled to an engines crankshaft, and an output shaft which lies in line with the input shaft and is coupled to wheels of the vehicle. To rotationally couple the input shaft to the output shaft, a typical vehicle transmission comprises one or more lay-shaft assemblies. Such a lay-shaft assembly comprises a lay-shaft which is rotatable around a central axis and is provided with at least three gearwheels. Typically one gearwheel of those gearwheels is fixedly connected to the lay-shaft and the others can be selectively coupled to the lay-shaft by means of clutching mechanism. This clutching mechanism is usually situated in between the connectable gearwheels, so that they can be controlled by a single operating lever, e.g. a shift fork. Typically the clutching mechanism comprises a dual-synchronizer including a synchronizer hub fixedly connected to the lay-shaft, and a sleeve movable in an axial direction of the lay-shaft. The sleeve can be movable in a first engaging position, wherein a rotation of the hub is coupled to a rotation of a first one of the connectable gearwheels, a second engaging position, wherein the rotation of the hub is coupled to rotation of a second one of the connectable gearwheels, and a neutral position, wherein the rotation of the hub is free of the rotation of the connectable gearwheels.

A disadvantage of the known lay-shaft assembly is that the selectable gearwheels need to be spaced apart at a certain distance, in order to provide the necessary room for the clutching mechanism. The connectable gearwheels may be placed adjacent to each other, but that would mean each gearwheel would need its own clutching mechanism on either side of the adjacent gearwheels. That configuration means that both gearwheels can not be operated with one operating lever anymore.

SUMMARY OF THE INVENTION

An object of the invention is to provide a lay-shaft assembly for use in a vehicle transmission with a decreased width between the output gears, without needing multiple clutching mechanism.

To that end, the invention provides a lay-shaft assembly for use in a vehicle transmission according to claim 1. More particular, the lay-shaft assembly according to the invention comprises a lay-shaft which is rotatable around a central axis, a first gearwheel rotatable around the lay-shaft and the central axis, a second gearwheel fixedly connected to the lay-shaft and rotatable with the lay-shaft around the central axis, and a clutching assembly rotatable around the lay-shaft and the central axis. The clutching assembly comprises a driven gearwheel and clutching mechanism for selectively coupling the rotation of the driven gearwheel to either the first gearwheel or the second gearwheel. The clutching assembly has a first axial end and a second axial end opposite the first axial end. The first gearwheel and the second gearwheel are arranged on a part of the lay-shaft extending from the first axial end of the clutching assembly.

The advantage of the current invention is that the first and the second gearwheel, can be much closer to each other than is known in the prior art. This is because they are arranged at one side of the clutching mechanism on the shaft part of the lay-shaft that extends from the first axial end of the clutching mechanism. Another advantage is that one operating lever can be used to control the clutching assembly and to selectively couple the first or the second gearwheel to the driven gear wheel. In prior art, such a dual-synchronizer can only be achieved by placing the clutching mechanism between the first and second gearwheels. According to the current invention the clutching mechanism is on one side of the gearwheels.

In an embodiment, the driven gearwheel may extend around the clutching mechanism.

An advantage is that the total length of the lay-shaft can be reduced as well. In the prior art the driven gearwheel was fixedly connected on the lay shaft. Consequently, the length of the lay-shaft should be chosen such as to be able to accommodate the accumulated width of the driven gearwheel, the first and the second gearwheels and the clutching assembly. In the current embodiment, the length of the lay-shaft can be chosen such as to be able to accommodate the accumulated width of the clutching assembly and the first and the second gearwheels. In other words there is no space on the lay-shaft needed to accommodate a driven gearwheel. Consequently, the lay-shaft can be shorter than is known in the prior art. This may be advantageous in a transmission where space is sparse.

The invention further provides a vehicle transmission comprising the lay-shaft assembly according to the invention and a vehicle comprising the vehicle transmission according to the invention.

The effects and advantages of the vehicle transmission and the vehicle according to the invention are the same as the effects and advantages of the lay-shaft assembly according to the invention and the effects and advantages are inserted here by reference.

The present invention will be further elucidated with reference to figures of exemplary embodiments. The embodiments may be combined or may be applied separately from each other.

DETAILED DESCRIPTION OF THE FIGURES

Figure 1:
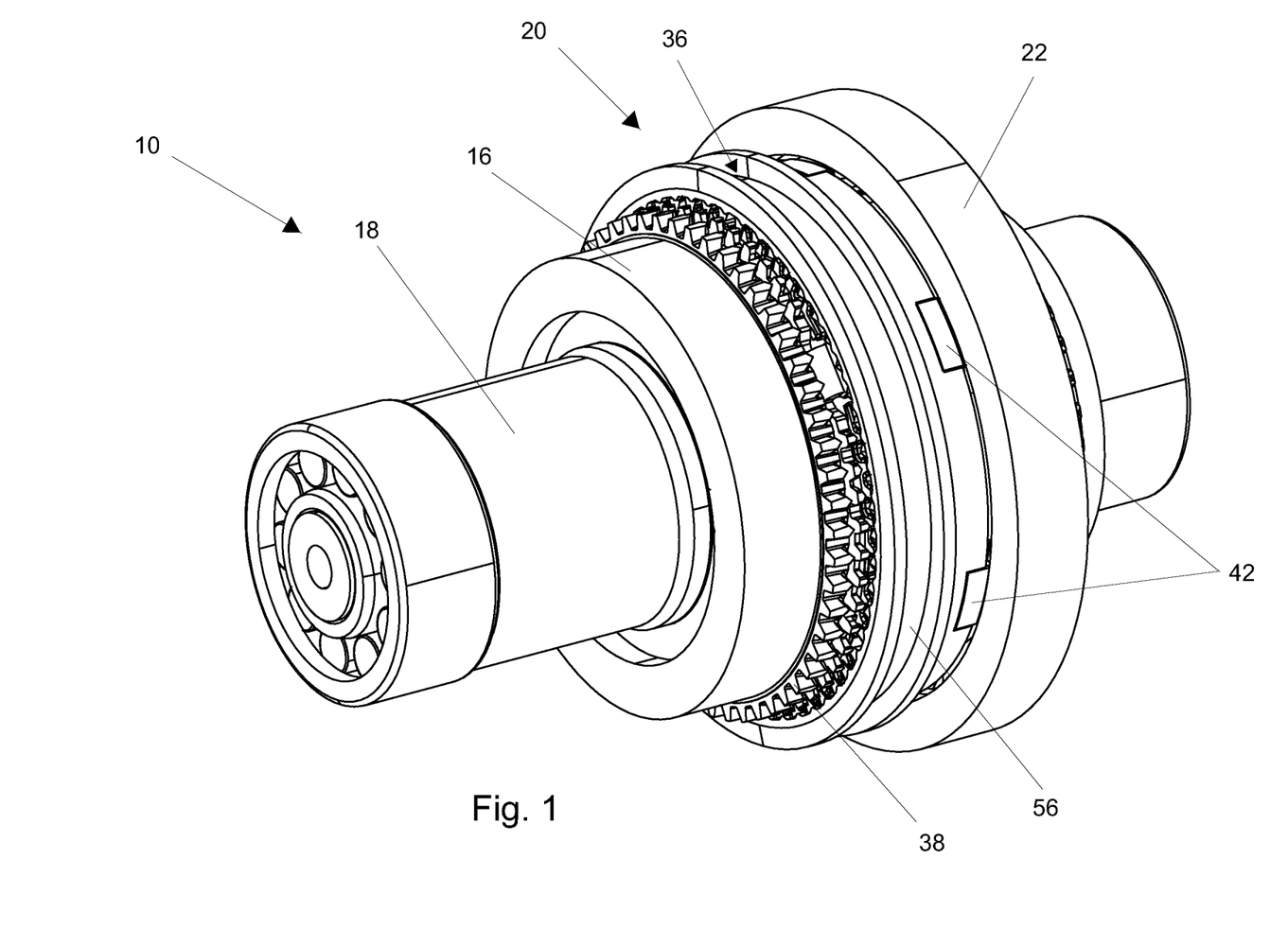
FIG. 1 shows a perspective side view of an example of the lay-shaft assembly.
Figure 2:
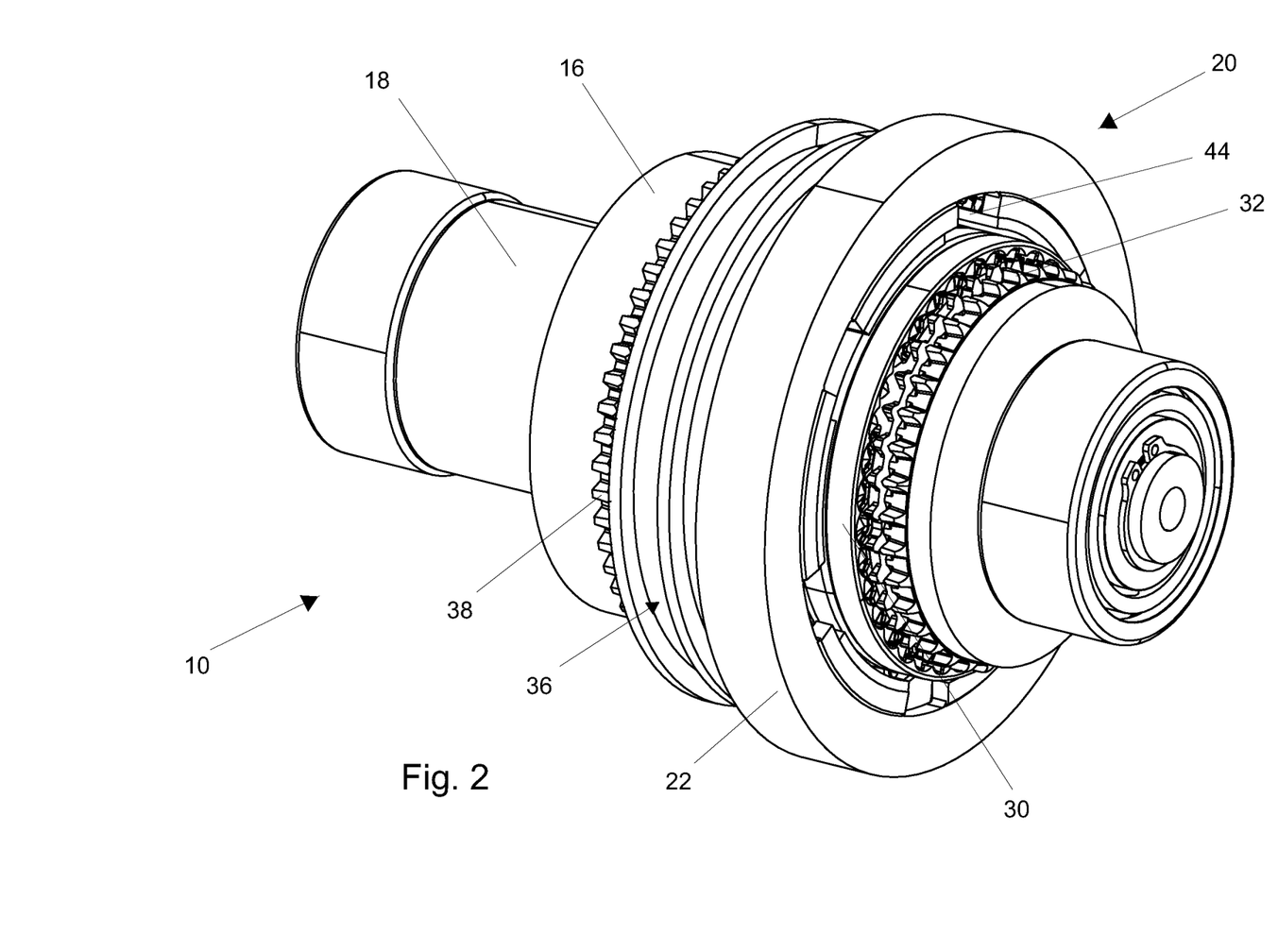
FIG. 2 shows another perspective side view of the example of the lay-shaft assembly of FIG. 1.
Figure 3:
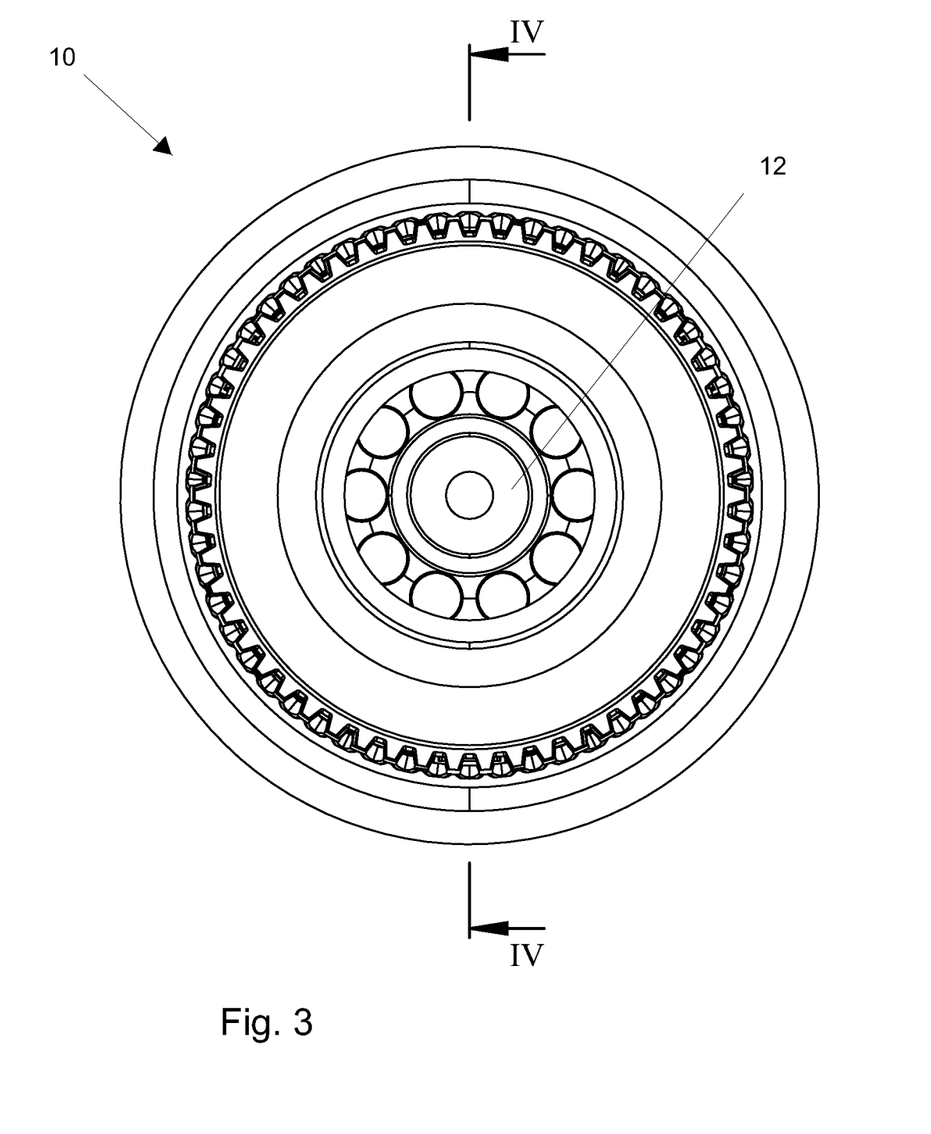
FIG. 3 shows a front view of the example of the lay-shaft assembly of FIG. 1.
Figure 4:
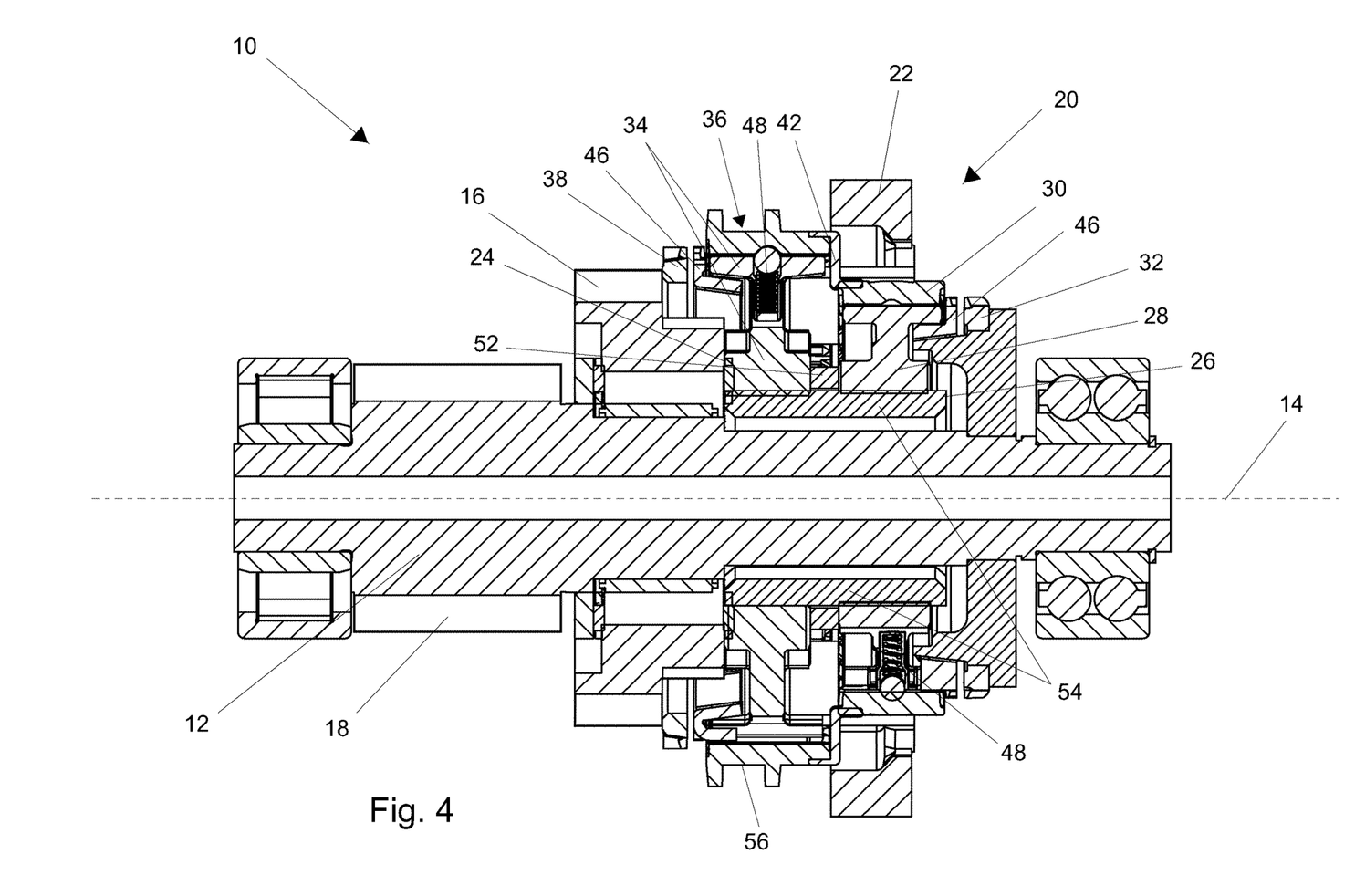
FIG. 4 shows a cross sectional view of the example of the lay-shaft assembly along line IV-IV in FIG. 3.
Figure 5:
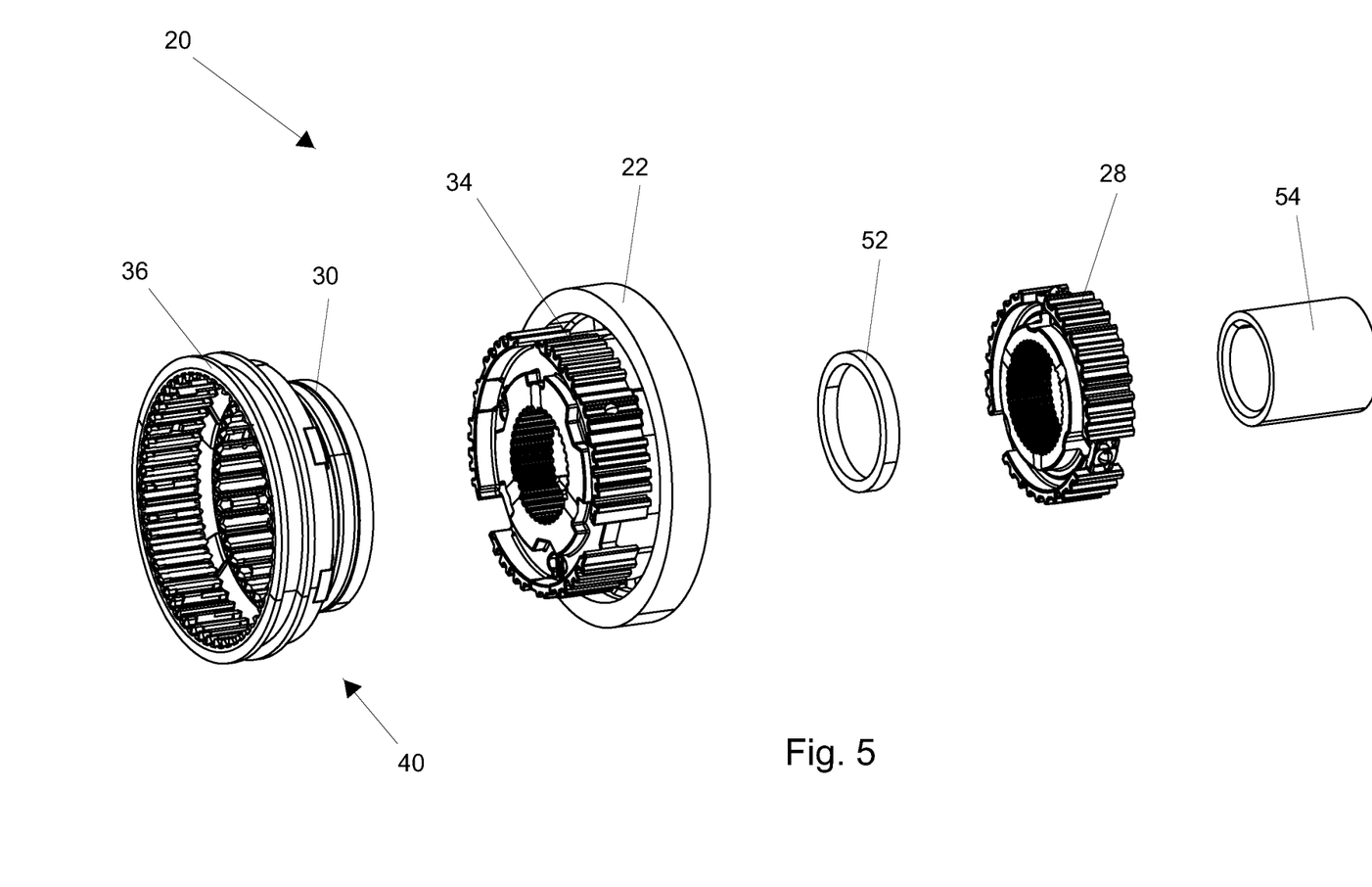
FIG. 5 shows an exploded side view of the clutching assembly of the example of FIG. 1.
Figure 6:
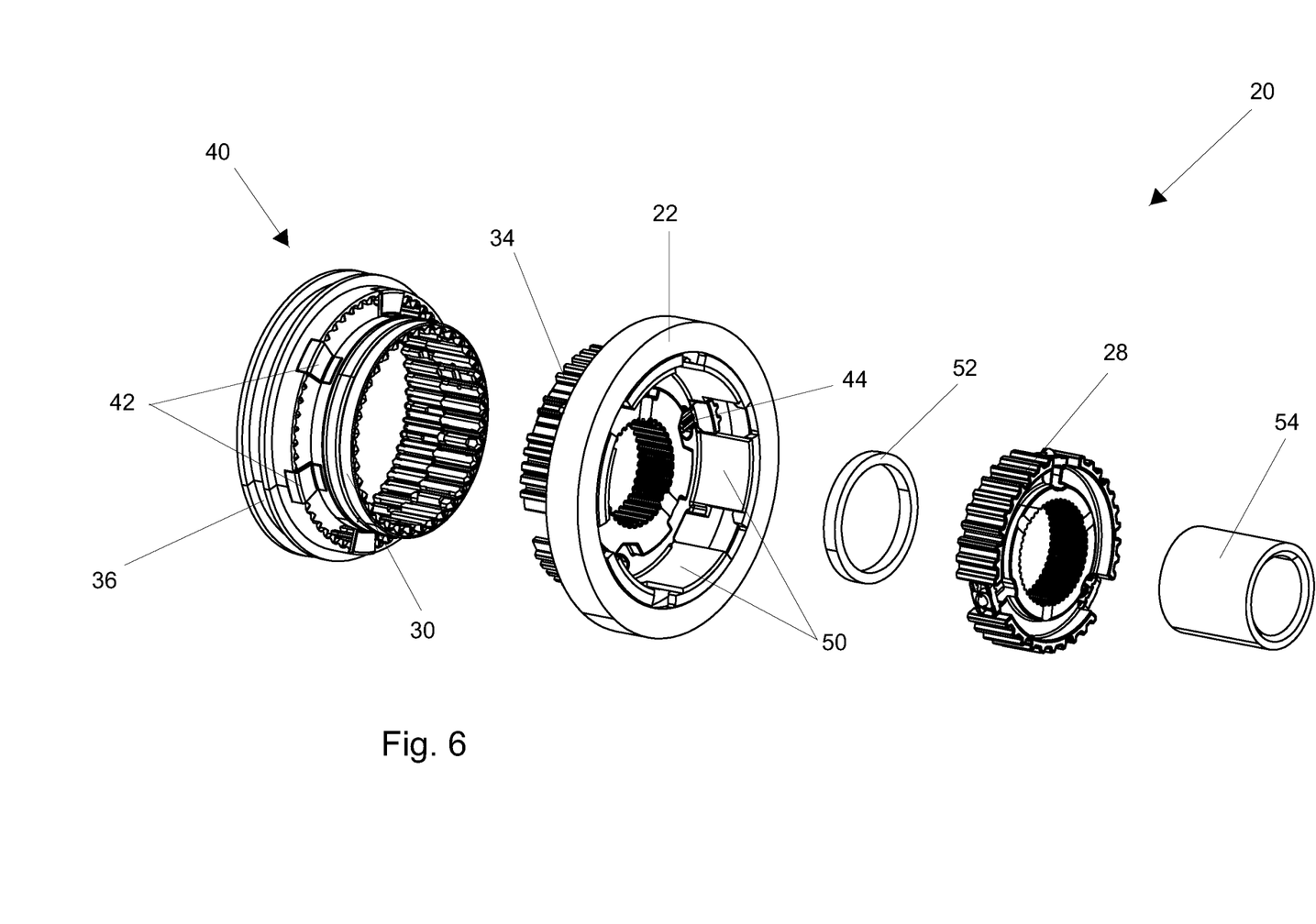
FIG. 6 shows another exploded side view of the clutching assembly of the example of FIG. 1.

In this application similar or corresponding features are denoted by similar or corresponding reference signs. The description of the various embodiments is not limited to the examples shown in the figures and the reference numbers used in the detailed description and the claims are not intended to limit the description of the embodiments, but are included to elucidate the embodiments by referring to the example shown in the figures.

In the most general terms, the invention relates to a lay-shaft assembly 10 for use in a vehicle transmission. The lay-shaft assembly 10 comprises a lay-shaft 12 which is rotatable around a central axis 14, a first gearwheel 16 rotatable around the lay-shaft 12 and the central axis 14, a second gearwheel 18 fixedly connected to the lay-shaft 12 and rotatable with the lay-shaft 12 around the central axis 14, and a clutching assembly 20 rotatable around the lay-shaft 12 and the central axis 14. The clutching assembly 20 comprises a driven gearwheel 22 and a clutching mechanism for selectively coupling the rotation of the driven gearwheel 22 to either the first gearwheel 16 or the second gearwheel 18. The clutching assembly 20 has a first axial end 24 and a second axial end 26 opposite the first axial end 24. The first gearwheel 16 and the second gearwheel 18 are arranged on a part of the lay-shaft 12 extending from the first axial end 24 of the clutching assembly 20.

The effects and advantages of the lay-shaft assembly 10 have been described in the summary section and these effects and advantages are inserted here by reference. It will be appreciated that the transfer of rotational moment or torque from the driven gearwheel 22 to the first or the second gearwheel 16, 18 could also be reversed. The first or second gearwheels 16, 18 would than be driven and drive the driven gearwheel 22 via the clutching mechanism.

In an embodiment, of which an example is shown in the figures, the driven gearwheel 22 may extend around the clutching mechanism. Consequently, the driven gearwheel 22 is positioned between the first and the second axial end 24, 26 of the clutching assembly 20.

In an embodiment, the clutching mechanism comprises a first synchronizer hub 28, a first synchronizer sleeve 30, a second synchronizer hub 34, and a second synchronizer sleeve 36. The first synchronizer hub 28 has splines on an outer surface. The second synchronizer hub 34 has splines on an outer surface and is fixedly connected to the driven gear wheel 22. The second synchronizer hub 34 is fixedly arranged relative to the first synchronizer hub 28. The first synchronizer sleeve 30 is slidably connected to the first synchronizer hub 28, and has splines on an inner surface which are configured to mesh with the splines of the first synchronizer hub 28 and with teeth on an outside surface of a first dog collar 32 provided on the lay-shaft 12. The first synchronizer sleeve 30 is movable in an axial direction of the central axis 14 between an engaging position wherein the first synchronizer sleeve 30 is slid over the first dog collar 32 rotably fixedly coupling the first synchronizer hub 28 with the first dog collar 32, and a release position wherein the first synchronizer sleeve 30 is slid away from the first dog collar 32 and wherein the first synchronizer hub 28 and the first dog collar 32 are decoupled. The second synchronizer hub 34 is rotably fixedly connected to the driven gearwheel 22, and has splines on an outer surface. The second synchronizer sleeve 36 is slidably connected to the second synchronizer hub 34, and has splines on an inner surface which are configured to mesh with the splines of the second synchronizer hub 34 and teeth on an outside surface of a second dog collar 38 provided on the first gearwheel 16. The second synchronizer sleeve 36 is movable in an axial direction of the central axis 14 between an engaging position wherein the second synchronizer sleeve 36 is slid over the second dog collar 38 rotably fixedly coupling the second synchronizer hub 34 with the second dog collar 38, and a release position wherein the second synchronizer sleeve 36 is slid away from the second dog collar 38 and wherein the second synchronizer hub 34 and the second dog collar 38 are decoupled. The first dog collar 32 is arranged on a part of the lay-shaft 12 extending from the second axial end 26 of the clutching assembly 20.

The first and the second synchronizer hubs 28, 34 and the driven gearwheel 22 are fixedly connected and thus have the same rotational speed as the driven gearwheel 22. The first dog collar 32 may be fixedly connected to the lay-shaft 12 and may thus have the same rotational speed as the lay-shaft 12. The second gearwheel 18 is fixedly connected to the lay-shaft 12 and thus has the same rotational speed as the lay-shaft 12. When the first synchronizer sleeve 30 is in the engaging position, the rotational moment or torque of the driven gearwheel 22 is transferred to the second gearwheel 18 via subsequently, the second synchronizer hub 34, the first synchronizer hub 28, the first synchronizer sleeve 30, the first dog collar 32, and the lay-shaft.

The second dog collar 38 may be fixedly connected to the first gearwheel 16 and may thus have the same rotational speed as the first gearwheel 16. When the second synchronizer sleeve 36 is in the engaging position, the rotational moment or torque of the driven gearwheel 22 is transferred to the first gearwheel 16 via subsequently. the second synchronizer hub 34, the second synchronizer sleeve 36, and the second dog collar 38.

In order to make an engaging connection, the first synchronizer hub 28 and first synchronizer sleeve 30 may be arranged near the first dog collar 32 which is arranged on the part of the lay-shaft 12 extending from the second axial end 26 of the clutching assembly 20. The first synchronizer hub 28 and the first synchronizer sleeve 30 may be provided at or near the second axial end 26 of the clutching assembly 20.

In order to make an engaging connection, the second synchronizer hub 34 and the second synchronizer sleeve 36 may be arranged near the second dog collar 38 which is provided on the first gearwheel 16 which is provided at the first axial end 24 of the clutching assembly 20 which is arranged on a part of the lay-shaft 12 extending from the first axial end 24 of the clutching assembly 20. The combination of the first synchronizer hub 28, first synchronizer sleeve 30 and the first dog collar 32 are thus provided on or near an axial end of the clutching assembly 20 opposite of the combination of the second synchronizer hub 34, second synchronizer sleeve 36 and second dog collar 38.

In an embodiment, the first synchronizer sleeve 30 and the second synchronizer sleeve 36 are fixedly connected to form a synchronizer sleeve assembly 40. The synchronizer sleeve assembly 40 may comprise connecting elements 42 fixedly connecting the first synchronizer 30 sleeve with the second synchronizer sleeve 36. The connecting elements 42 may extend through corresponding holes 44 in the driven gearwheel 22.

The first synchronizer sleeve 30 and the second synchronizer sleeve 36 can be used to selective couple the rotation of the driven gearwheel 22 with respectively the second gearwheel 18 and the first gearwheel 16. Coupling both gearwheels 16, 18 simultaneously to the driven gearwheel 22 should be prevented, since this would most likely damage the transmission of which the lay-shaft assembly may be part of. By connecting the first synchronizer sleeve 30 and the second synchronizer sleeve 36 it is achieved that at any moment only one of the sleeves 30, 36 can be placed in the engaging position. Since, in the embodiment, the combination of the first synchronizer hub 28, first synchronizer sleeve 30 and the first dog collar 32 may be provided on or near one end of the clutching assembly 20 and the combination of the second synchronizer hub 34, second synchronizer sleeve 36 and second dog collar 38 is provided on the other end of the clutching assembly 20, the connecting elements 42 need to bypass the driven gearwheel 22. This can be done by means of the connecting elements 42 extending through the holes 44 in the driven gearwheel 22. This is possible because the first and second synchronizer sleeves 30, 36 have the same rotational speed as the driven gearwheel 22.

In an embodiment, the synchronizer sleeve assembly 40 may comprise three gear positions: a first gear position, a second gear position, and a neutral gear position. In the first gear position, the first synchronizer sleeve 30 is in the engaging position and the second synchronizer sleeve 36 is in the release position. In the second gear position, the first synchronizer sleeve 30 is in the release position and the second synchronizer sleeve 36 is in the engaging position. In the neutral gear position, both the first and the second synchronizer sleeves 30, 36 are in the release position.

The lay-shaft assembly 10 may further comprise a shift fork as an embodiment of an operating lever. The shift fork may be operatively connected to one of the first or the second synchronizer sleeves 30, 36, and may be configured to axially translate the synchronizer sleeve assembly 40. The operative connection between the shift fork and the synchronizer sleeve assembly 40 may be formed by an engagement of the shift fork with a circumferential groove 56 in the synchronizer sleeve assembly 40. The shift fork may set the synchronizer sleeve assembly 40 in one of its three gear positions.

By having a neutral gear position for the synchronizer sleeve assembly it is possible to decouple the driven gearwheel 22 from both the first and the second gearwheel 16, 18. This is necessary when a transmission of which the lay-shaft assembly 10 may be part is, comprises multiple lay-shaft assemblies 10. In order not to damage such a transmission at any time, only one gearwheel 16, 18 of only one of the lay-shaft assemblies 10 can be in the engaging position. All other gearwheels 16, 18 need to be in the release position. Another advantage of the synchronizer sleeve assembly 40 is that the connected sleeves 30, 36 can be moved in an axial direction by means of a single shift fork.

In an embodiment, a diameter of the first synchronizer hub 28 is smaller than a diameter of the second synchronizer hub 34. The driven gearwheel 22 may be connected to at least one arm 50 which may be provided on the second synchronizer hub 34 and may be protruding from the second synchronizer hub 34 in an axial direction of the central axis 14.

By using synchronizer hubs 28, 34 with differing diameters, the arm 50 may place the driven gearwheel 22 radially outside of the first synchronizer hub 28. The axial width of the clutching assembly 20 is then less than it would be when the synchronizer hubs 28, 34 would be placed axially next to the driven gearwheel 22. It will be appreciated that the diameter of the first synchronizer hub 28 can also be bigger than the diameter of the second synchronizer hub 34. The at least one arm 50 may than be provided on the first synchronizer hub 28. The first and the second synchronizer hubs 28, 34 may have internal splines which engage external splines (not shown) of a bearing hub 54. Thus the bearing hub 54 may form the connection between the first and the second synchronizer hubs 28, 34. A spacer ring 52 may define the exact axial distance between the first and the second synchronizer hubs 28, 34. Alternatively the first synchronizer hub 28 and the second synchronizer hub 34 may be one integrally formed part that is rotatably mounted on the lay-shaft 12. The driven gearwheel 22 may then be connected to a middle part of the integrally formed part. The bearing hub 54 may include an inner race which may be rotatably fixedly connected to the lay-shaft 12 and an outer race which may comprise said external splines (not shown) for rotatably fixedly connecting the first and second synchronizer hubs 28, 34. The bearing hub 54 will thus provide the means for the clutching assembly 20 to be rotatable around the lay-shaft 12 and the central axis 14.

In an embodiment, the lay-shaft assembly 10 further comprises a first synchronizer ring 46 provided between the first synchronizer hub 28 and the first dog collar 32 which, in use, synchronizes a rotation of the first synchronizer hub 28 with a rotation of the first dog collar 32 before the splines of the first synchronizer sleeve 30 engage the teeth of the first dog collar 32. The lay-shaft assembly 10 may further comprise a second synchronizer ring 46 provided between the second synchronizer hub 34 and the second dog collar 38 which, in use, synchronizes a rotation of the second synchronizer hub 34 with a rotation of the second dog collar 38 before the splines of the second synchronizer sleeve 36 engage the teeth of the second dog collar 38. Both synchronizer rings 46 may be a cone clutch synchronizer.

Because the rotational speed of the first and the second synchronizer hub 28, 34 is uncorrelated with the rotational speed of the first dog collar 32, respectively second dog collar 38, these rotational speeds will most likely differ. A synchronizer ring 46 is a known, customary means for synchronizing the rotational speed of two rotating elements. A synchronizer ring uses friction to synchronize the rotational speeds of the two elements. Using a synchronizer ring will reduce or eliminate the rattling sound of grinding teeth during engagement of the synchronizer sleeve 30, 36 with the corresponding dog collar 32, 38. Also, the clutching mechanism will be less prone to damage.

In an embodiment, the clutching mechanism further comprises biasing means 48 for biasing the first synchronizer sleeve 30 and/or the second synchronizer sleeve 36 in the release position. The biasing means 48 may comprise a spherical element, e.g. a ball, and a spring provided in the first and/or second synchronizer hub 28, 34, and a groove provided in the corresponding first and/or second synchronizer sleeve 30, 36. The spring may push the spherical element in the groove.

The biasing means 48 will exert a force on the synchronizer sleeve 30, 36 to remain in the release position. Forces exerted on the synchronizer sleeve 30, 36 will have to overcome this force in order to set the synchronizer sleeve 30, 36 in the engaging position. This prevents unintended movement of the synchronizer sleeve 30, 36 e.g. as a result of vibration. Only when the synchronizer sleeve 30, 36 is intentionally and/or actively moved will the synchronizer sleeve 30, 36 be brought in the engaging position.

The invention further relates to a vehicle transmission comprising the lay-shaft assembly 10 according to the invention and to a vehicle comprising the vehicle transmission according to the invention.

The effects and advantages of the vehicle transmission and the vehicle have been described in the summary section and these effects and advantages are inserted here by reference.

The various embodiments which are described above may be implemented independently from one another and may be combined with one another in various ways. The reference numbers used in the detailed description and the claims do not limit the description of the embodiments nor do they limit the claims. The reference numbers are solely used to clarify.

LEGEND

10—lay-shaft assembly
12—lay-shaft
14—central axis
16—first gearwheel
18—second gearwheel
20—clutching assembly
22—driven gearwheel
24—first axial end
26—second axial end
28—first synchronizer hub
30—first synchronizer sleeve
32—first dog collar
34—second synchronizer hub
36—second synchronizer sleeve
38—second dog collar
40—synchronizer sleeve assembly
42—connecting element
44—hole
46—synchronizer ring
48—biasing means
50—arm
52—spacer ring
54—bearing hub
56—circumferential groove in synchronizer sleeve assembly

The invention claimed is:

1. A lay-shaft assembly for use in a vehicle transmission, comprising:
   a lay-shaft which is rotatable around a central axis;
   a first gearwheel rotatable around the lay-shaft and the central axis;
   a second gearwheel fixedly connected to the lay-shaft and rotatable with the lay-shaft around the central axis; and
   a clutching assembly rotatable around the lay-shaft and the central axis, the clutching assembly comprising a driven gearwheel and a clutching mechanism for selectively coupling the rotation of the driven gearwheel to either the first gearwheel or the second gearwheel, wherein the clutching assembly has a first axial end and a second axial end opposite the first axial end,
   wherein the first gearwheel and the second gearwheel are arranged on a part of the lay-shaft extending from the first axial end of the clutching assembly,
   wherein the driven gearwheel extends around the clutching mechanism and is positioned between the first axial end and the second axial end of the clutching assembly.

2. The lay-shaft assembly according to claim 1, wherein the clutching mechanism comprises:
   a first synchronizer hub having splines on a first outer surface;
   a second synchronizer hub having splines on a second outer surface and being fixedly connected to the driven gear wheel, wherein the second synchronizer hub is fixedly arranged relative to the first synchronizer hub;
   a first synchronizer sleeve slidably connected to the first synchronizer hub, and having splines on an inner surface which are configured to mesh with the splines of the first synchronizer hub and with teeth on an outside surface of a first dog collar provided on the lay-shaft, the first synchronizer sleeve being movable in an axial direction of the central axis between an engaging position wherein the first synchronizer sleeve is slid over the first dog collar rotably fixedly coupling the first synchronizer hub with the first dog collar, and a release position wherein the first synchronizer sleeve is slid away from the first dog collar and wherein the first synchronizer hub and the first dog collar are decoupled;
   and
   a second synchronizer sleeve slidably connected to the second synchronizer hub, and having splines on an inner surface which are configured to mesh with the splines of the second synchronizer hub and with teeth on an outside surface of a second dog collar provided on the first gearwheel, the second synchronizer sleeve being movable in an axial direction of the central axis between an engaging position wherein the second synchronizer sleeve is slid over the second dog collar rotably fixedly coupling the second synchronizer hub with the second dog collar, and a release position wherein the second synchronizer sleeve is slid away from the second dog collar and wherein the second synchronizer hub and the second dog collar are decoupled,
   wherein the first dog collar is arranged on a part of the lay-shaft extending from the second axial end of the clutching assembly.

3. The lay-shaft assembly according to claim 2, wherein the first synchronizer sleeve and the second synchronizer sleeve are fixedly connected to form a synchronizer sleeve assembly.

4. The lay-shaft assembly according to claim 3, wherein the synchronizer sleeve assembly comprises connecting elements fixedly connecting the first synchronizer sleeve with the second synchronizer sleeve, wherein the connecting elements extend through corresponding holes in the driven gearwheel.

5. The lay-shaft assembly according to claim 3, wherein the synchronizer sleeve assembly comprises three gear positions:
   a first gear position, wherein the first synchronizer sleeve is in the engaging position and the second synchronizer sleeve is in the release position;
   a second gear position, wherein the first synchronizer sleeve is in the release position and the second synchronizer sleeve is in the engaging position; and
   a neutral gear position, wherein both the first and the second synchronizer sleeves are in the release position.

6. The lay-shaft assembly according to claim 3, further comprising a shift fork, wherein the shift fork is operatively connected to one of the first or the second synchronizer sleeves, and is configured to axially translate the synchronizer sleeve assembly.

7. The lay-shaft assembly according to claim 5, wherein the shift fork sets the synchronizer sleeve assembly in one of its three gear positions.

8. The lay-shaft assembly according to claim 2, wherein a diameter of the first synchronizer hub is smaller than a diameter of the second synchronizer hub, and wherein the driven gearwheel is connected to at least one arm which is provided on the second synchronizer hub and is protruding from the second synchronizer hub in an axial direction of the central axis.

9. The lay-shaft assembly according to claim 2, wherein the first synchronizer hub and the second synchronizer hub are one integrally formed part.

10. The lay-shaft assembly according to claim 2, further comprising a first synchronizer ring provided between the first synchronizer hub and the first dog collar and which, in use, synchronizes a rotation of the first synchronizer hub with a rotation of the first dog collar before the splines of the first synchronizer sleeve engage the teeth of the first dog collar.

11. The lay-shaft assembly according to claim 10, further comprising a second synchronizer ring provided between the second synchronizer hub and the second dog collar and which, in use, synchronizes a rotation of the second synchronizer hub with a rotation of the second dog collar before the splines of the second synchronizer sleeve engage the teeth of the second dog collar.

12. The lay-shaft assembly according to claim 11, wherein the first synchronizer ring and/or second synchronizer ring is a cone clutch synchronizer.

13. The lay-shaft assembly according to claim 2, wherein the clutching mechanism further comprises biasing means for biasing the first synchronizer sleeve and/or the second synchronizer sleeve in the release position.

14. The lay-shaft assembly according to claim 13, wherein the biasing means comprise a spherical element and a spring provided in the first and/or second synchronizer hub, and a groove provided in the corresponding first and/or second synchronizer sleeve, wherein the spring pushes the spherical element in the groove.

15. A vehicle transmission comprising the lay-shaft assembly according to claim 1.

16. A vehicle comprising the vehicle transmission according to claim 15.

* * * * *